United States Patent [19]
Estevas-Guilmain

[11] Patent Number: 6,098,400
[45] Date of Patent: Aug. 8, 2000

[54] DIVERGENT PETAL FOR GAS TURBINE ENGINE NOZZLE

[75] Inventor: Javier Estevas-Guilmain, Hondarribia, Spain

[73] Assignee: Industrai de Turbo Propulsores, S.A., Zamudio, Spain

[21] Appl. No.: 09/012,801

[22] Filed: Jan. 23, 1998

[30] Foreign Application Priority Data

Jan. 23, 1997 [EP] European Pat. Off. ............. 97500016

[51] Int. Cl.[7] ................................................... F02K 1/12
[52] U.S. Cl. ................. 60/232; 239/265.39; 239/265.41
[58] Field of Search ............... 60/230, 232; 239/265.19, 239/265.33, 265.37, 265.39, 265.41, 265.43

[56] References Cited

U.S. PATENT DOCUMENTS

| | | | |
|---|---|---|---|
| 2,880,575 | 4/1959 | Scialla | 60/35.54 |
| 2,969,189 | 1/1961 | Jordan | 239/455 |
| 2,999,354 | 9/1961 | Gallo et al. | 239/265.41 |
| 4,819,876 | 4/1989 | Thayer | 60/232 |
| 5,775,639 | 7/1998 | Fage | 239/265.33 |
| 5,794,850 | 8/1998 | Gutierrez, Jr. | 265/265.41 |
| 5,893,518 | 4/1999 | Bruchez et al. | 239/265.39 |

FOREIGN PATENT DOCUMENTS 2 180 440  11/1973  France .

*Primary Examiner*—Ted Kim
*Attorney, Agent, or Firm*—Darby & Darby

[57] ABSTRACT

Divergent petal for a gas turbine engine nozzle. This petal (2) is articulated in its front edge to a convergent petal (1), by means of a cylindrical joint (4) while its back surface is articulated at an intermediate point to a compression bar (5) by means of the cylindrical joint (6), the cylindrical joints (4 and 6) being perpendicular to the engine axis.

Petal (2) is composed of a traction bar (11) and a aerodynamic base plate (10) which forms the nozzle duct, both components being related one to the other by a front joint (13–16) which coincides with cylindrical joint (4) between convergent (1) and divergent (2) petals, and a rear joint (14–18) which coincides with with joint (6) between divergent petal (2) and compression bar (5), with said rear joint (14–18) being displaceable a certain distance in a direction functionally parallel to the base plate (10).

5 Claims, 2 Drawing Sheets

DIVERGENT PETAL FOR GAS TURBINE ENGINE NOZZLE

The present invention relates to a divergent petal for a gas turbine engine nozzle.

Thrust is produced in a gas turbine engine by expelling a high velocity gas stream through the engine exit nozzle. Air enters the engine through a diffuser and starts the cycle by being compressed. Heat is added to the air by combustion in an appropriate chamber. Hot gas is expanded in the turbine. Part of the work generated is used to drive the above mentioned compressor. The continuing expansion of the gas in the nozzle extracts the remaining energy from the gas in a high velocity stream that constitutes the engine thrust. This thrust can vary between hundreds of newtons and hundreds of kilonewtons.

Certain military aircraft are equipped with gas turbine engines that utilize a convergent-divergent type exit nozzle. An array of convergent petals is located at the exit section of the engine that reduce the area of the gas flow path. The minimum area section of this flow path is referred to as the nozzle throat area. In the same way, a second set of divergent petals is located and articulated to the first set. This set of petals shape an increasing area flow path, its area being referred to as the nozzle exit area. In the cruise condition petals are position so that the engine works at its the maximum efficiency. However, during take off and acceleration maneuvers the petals are positioned according to the required mass flow and pressure ratio. The new requirements can only be achieved through a change in the nozzle geometry. These requirements vary with altitude and aircraft speed.

The petals that form the convergent-divergent nozzle are independent elements that once installed work together as a unit. Each convergent petal is individually related to the engine by a joint between its front edge and the engine exit section. Divergent petals are individually articulated to the matching convergent petal by a joint between its front edge and the convergent petal rear edge. A compression bar is articulated to the engine static structure by its front end and to an intermediate pin in the divergent petal by its rear end. The four mentioned joints are parallel to each other and perpendicular to the engine axis. Each pair of convergent-divergent petal together with the compression bar define a four bar linkage mechanism. The movement of such mechanism is generally obtained by pivoting the convergent petal respect to its front joint by means of a cam and roller system. The four bar linkage mechanism allows the variation the throat and exit areas simultaneously, that is, allows one single degree of freedom, in a way determined by the lengths and angles of the elements that define it. The side of the petals exposed to the gas flow, referred to as the front side, will receive pressure and thermal loads from the gas. Temperature at this side of the petal can reach values of 1200° C., while the temperature at the back side of the petal will not reach values above 500° C.

Gas pressure acting normally to the petals surface impose two different type of loads on the divergent petals: bending loads due to the pressure distribution and traction/compression loads between the two joints as an element of the four bar linkage mechanism.

Divergent petals are frequently replaced due to the aggressive working conditions that have to withstand being in contact with the hot gas stream.

The object of the present invention is a divergent petal for a gas turbine engine convergent-divergent nozzle with a more efficient load resisting structure and better response to thermal and mechanical loads as compared to a conventional single piece divergent petal.

According to the invention, the divergent petal comprises a base plate and a traction bar situated on the back surface of the plate and related to it by a cylindrical joint perpendicular to the engine axis, coincident with the convergent and divergent petal joint, and a slip joint, whose slip direction is parallel to the base, and coincident with the traction and compression bar joint.

The base plate will be preferably fitted with longitudinal stiffening elements on its back side. Such elements may be at least one longitudinal fin which will add bending stiffness to the base plate, enough to withstand the gas pressure load.

With the above mentioned configuration the gas pressure load is transmitted totally to the four bar linkage mechanism through its nodes and the effects of bending loads and traction loads are separated and act on the base plate and traction bar respectively, obtaining a more efficient petal structure. Another advantage of the above mentioned configuration is that the base plate and traction bar can be made using different materials selected according to the different temperature values that each part will be exposed to, thus obtaining a lighter and cheaper structure without the induced effects of thermal expansions.

Another advantage of the above mentioned configuration is the possibility of replacing the base plate which is exposed to the hot gas flow when it reaches its useful life without replacing the whole petal.

The base plate will be preferably fitted with two longitudinal fins on its back side which will extend to the proximity of the front and rear edges of the plate. These fins will include front holes opposed on each fin and rear holes also opposed to each other and longitudinally slotted for the rear joint.

According to another characteristic of the invention, the traction bar may have an elastically varying length, as a function of the applied axial load, between predetermined values. This possibility will allow a change in the nozzle exit area without a change in the nozzle throat area.

The traction bar may be constituted by two concentric bars one of which will slide inside the other and related through a spring which will impulse them to the position of maximum coupling/minimum length. The concentric bars are equipped with stop ends which limit the bar total elongation.

The rear hole slotted which allows the displacement of the rear joint will have a trajectory defining a cam that will drive the displacement of the rear joint in order to vary the exit area of the divergent part of the nozzle.

The above mentioned characteristics and advantages will be better understood with the following description with reference to the attached drawings, which show a possible arrangement but not limited to it In the drawings.

Figure 1:
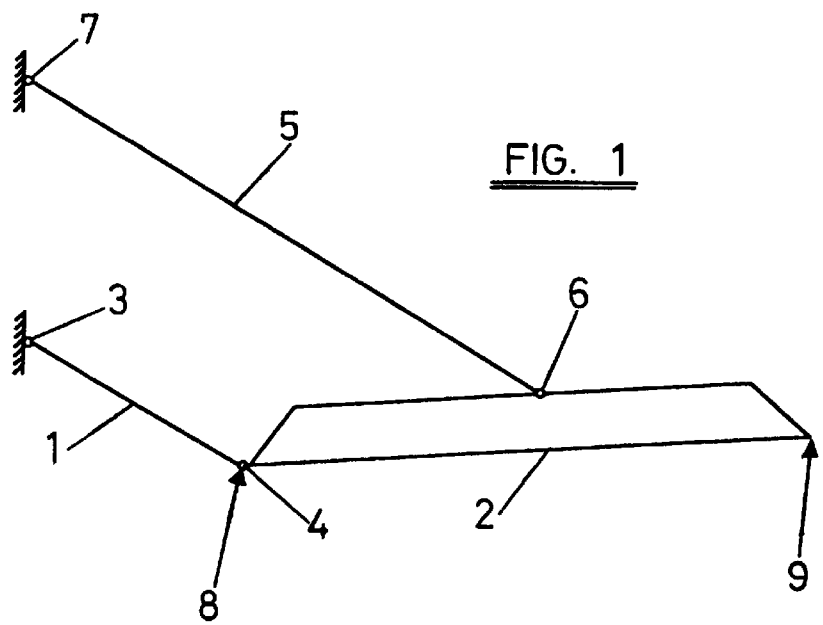
FIG. 1 is a partial schematic cross section of the four bar linkage mechanism showing the assembly of a pair of convergent and divergent petals related to each other and to the compression bar.

FIG. 1 schematically shows the way a pair of convergent (1) and divergent (2) petals are fitted to form a gas turbine engine exit nozzle. The convergent petal (1) is related to the perimeter of the engine exit section of the engine ahead of the nozzle by a cylindrical joint (3). The divergent petal (2) is articulated to the rear end of the convergent petal (1) by a cylindrical joint (4). The divergent petal (2) is also related to a compression bar (5) by a cylindrical joint (6) This bar is connected to the engine static structure by another cylindrical joint (7).

The cylindrical joints (3), (4), (6) and (7) are parallel to each other and perpendicular to the engine axis.

The described arrangement defines a four bar linkage mechanism allowing the pivoting of the petals (1) and (2) from or to the engine axis to modify the throat and exit areas. The four bar linkage mechanism allows the simultaneous variation of the throat and exit areas defined respectively by the rear edge (8) of the convergent petal (1) and the rear edge (9) of the divergent petal (2).

The divergent petal (2) is constituted according to the invention by a base plate (10) and a traction bar (11) situated on the back side of the mention plate.

Figure 2:
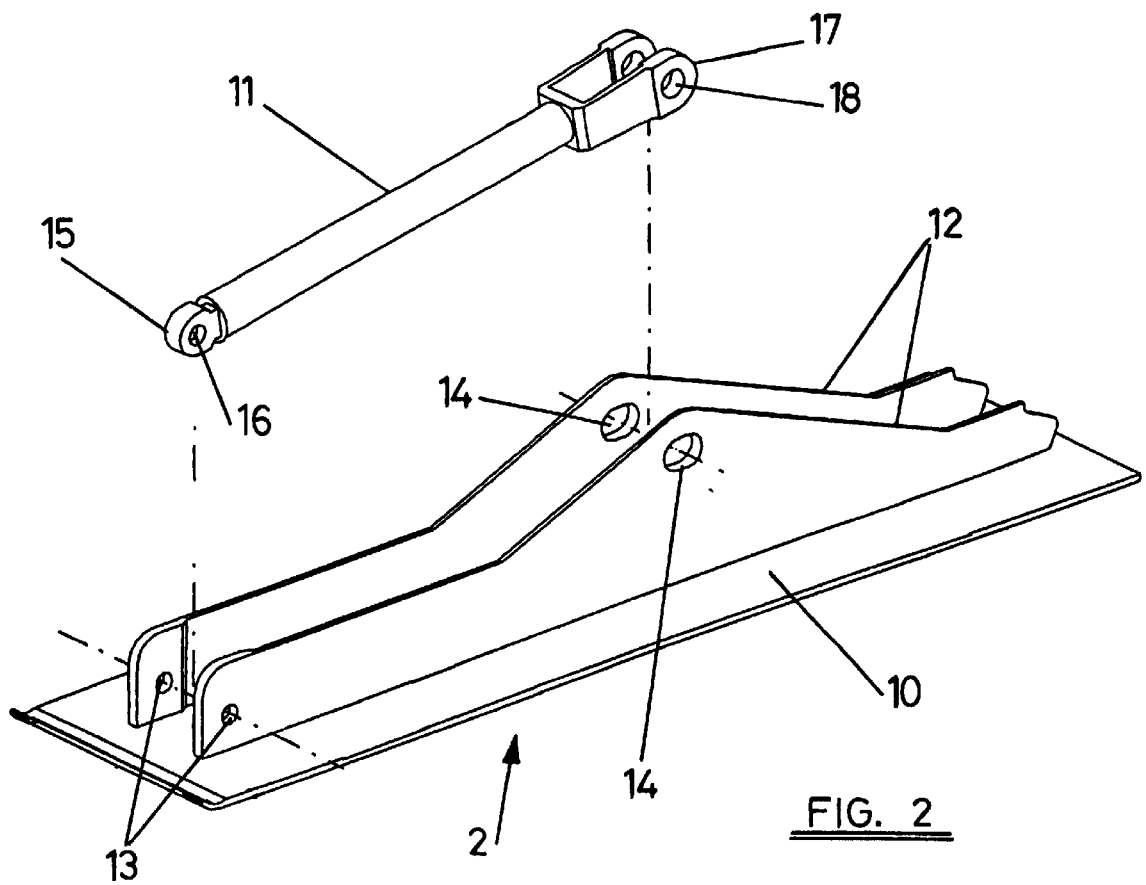
FIG. 2 is an exploded perspective view of the divergent petal of the invention showing the parts in the described invention.

The base plate (10) may be flat or slightly curved, with a rectangular or trapezoidal perimeter, one of its surfaces being exposed to the hot gas stream. Such base plate has stiffening elements on its back side that in FIG. 2 consist of two longitudinal fins (12) which add bending stiffness to the petal. A pair of opposite holes (13) near the front end as well as a pair of opposite slotted holes (14) on an intermediate location exist on the pair of stiffeners.

The traction bar (11) preferably of straight axis may be either hollow or solid and has one or more lugs (15) with opposite holes (16) on its front end and one or mode lugs (17) with opposite holes (18) on its rear end.

The lugs (15), (17) fit with the stiffeners (12) in such a way that the hole (16) is aligned with the circular holes (13) and the hole (18) is aligned with the slotted holes (14) and receive connecting cylindrical pins. The pin introduced through the holes (13) and (16) is at the same time the linking element with the connecting lug in the convergent petal (1) completing the cylindrical joint (4) between convergent (1) and divergent (2) petals. In the same way the pin introduced through the holes (14) and (18) is the linking element with the connecting rear lug in the compression bar (5) completing the cylindrical joint (6) which can slide along the slotted holes (14) completing the sliding joint between the slotted holes (14) and the holes in the traction bar rear lugs (18).

The direction of the slotted holes (14) are relatively parallel to the base plate (10) to let the base behave as an isostatic two span beam when loaded with the gas pressure. The first span is defined between the two cylindrical joints (4) and (6) while the second span, cantilevered, is defined between the cylindrical joint (6) and the rear edge (9) of the divergent petal (2). The bending moment distribution along the petal axis determines the shape of the longitudinal stiffeners (12).

The two main components of the divergent petal (2), the traction bar (11) and base plate (10), may be fabricated using materials and manufacturing methods specifically adapted to the elements own requirements. The base plate can be made out of sheet metal using a heat resisting alloy, usually a nickel base alloy or even ceramic material, characterized by showing good resistance to the thermal shocks that the petals will see with the engine operation. On the other hand, the traction bar (11) can be made with a lower temperature capability, thus cheaper material. Using different materials in parts that are exposed to different temperatures lead to the existence of thermal mismatch loads due to the different expansion of the parts. The invention shown here, by means of the slotted holes (14) in the stiffeners (12) allows the free expansion of the hot base plate (10) with respect to the cold traction bar (11) without introducing thermal stresses.

Another characteristic of the divergent petal (2) is the possibility of giving the traction bar (11) some flexibility in the direction of its longitudinal axis in such a way that the load acting on the bar, in the same direction as the bar axis, will induce a increase in the length of the bar during the normal operation of the nozzle and consequently vary the geometry of the four bar linkage mechanism.

Figure 3:
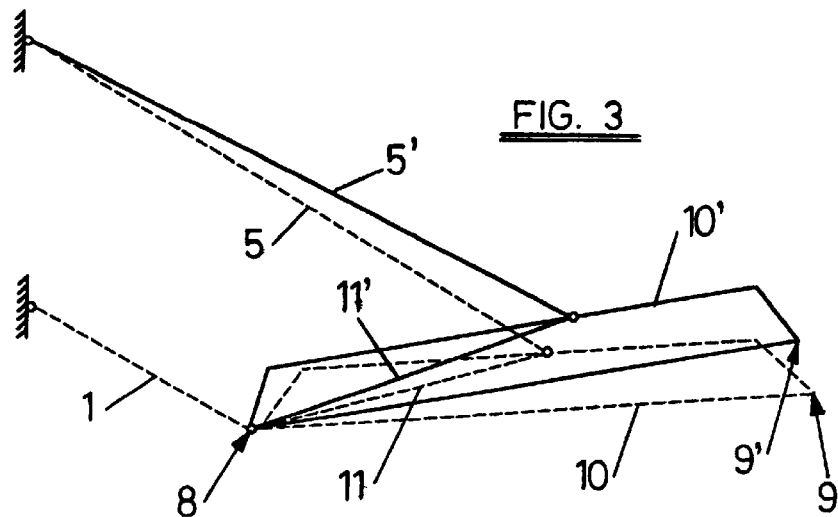
FIG. 3 is a partial schematic cross section of the four bar linkage mechanism showing the working principle of the invention with the petal fitted with an elastic traction bar.

FIG. 3 shows this effect, the discontinuous line drawing referencing the original position and the continuous line drawing referencing the result of keeping the same convergent petal (1) in its original position and the compression bar (5') with the same length as the original one (5) but accommodated to the new length of the traction bar (11') whose original position and length are referenced by (11). The base plate (10) now lies in position (10'). The achieved effect is the increase in the nozzle exit area which in the original arrangement is referenced by (9) to the reference (9'), without a change in the nozzle throat area (8), avoiding the limitation imposed by the only degree of freedom of the four bar linkage mechanism.

Figure 4:
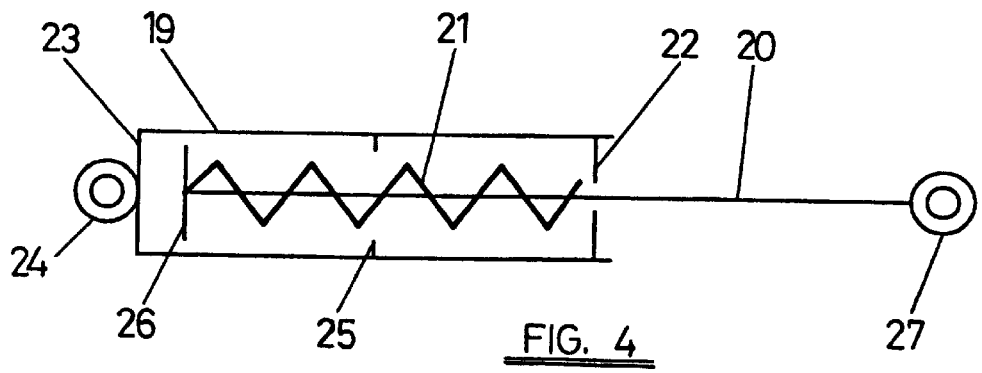
FIG. 4 is a schematic cross section of a possible layout of the traction bar in the invention.

One of the multiple embodiments that allow this effect includes a traction bar as the one represented in FIG. 4, made by two bars (19) and (20) connected telescopically. Inside bar (19) and around bar (20) there is a compression spring (21). The bar (19) may be designed as a cylinder one of its ends (22) perforated by the bar (20) while the other end (23) supports a lug (24) which is related to the lug (15) in the traction bar (11), FIG. 2, and forms part of the cylindrical joint (4) between the base plate (10) and the convergent petal (1). The hollow bar (19) holds an interior stop end (25) that limits the maximum elongation of the spring (21). The bar (20) has a forward end (26) inside the bar (19) on which the spring (21) rests, while the opposite end supports a lug (27) which is articulated to the compression bar (5) and the intermediate holes (14) in the divergent petal stiffeners (12).

The elastic bar can be designed to be active in the whole range of the applied loads, to be active when the applied load reaches a certain value or to stop being active when the applied load reaches a certain value. In case the desired working range of the bar starts at a certain load value the spring (21) will be preloaded to the desired value. In this case, when the applied load is less than the preload, the end (26) of the bar (20) will rest on the end (23) of the bar (19). In case the desired working range of the bar is limited to a certain value of the applied load, the spring elongation must be limited by the end (25) to a value equal to the desired maximum load value divided by the spring rate minus the spring preload.

Figure 5:
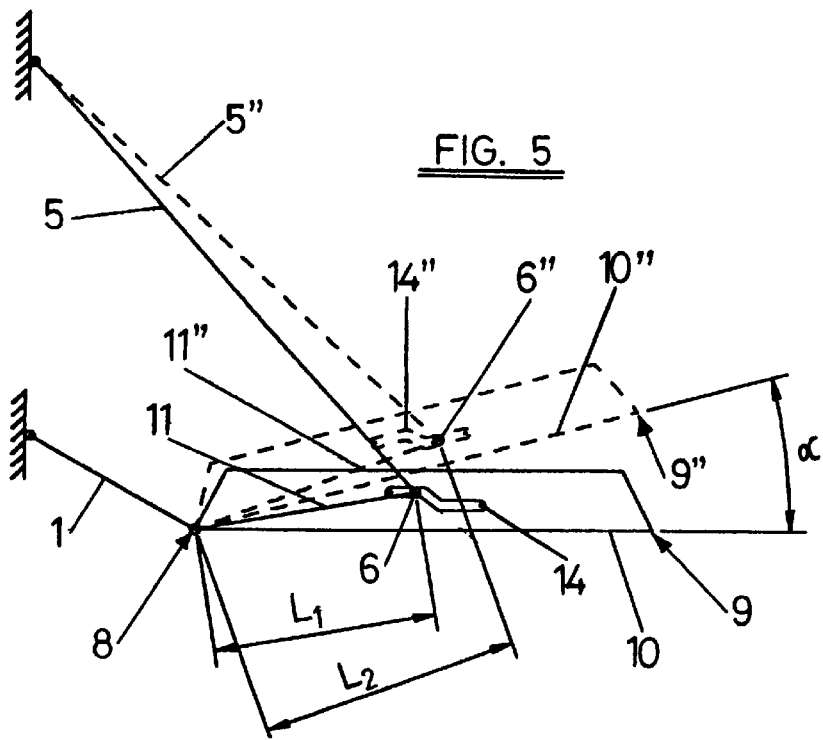
FIG. 5 is a partial schematic cross section of the four bar linkage mechanism showing the working principle of the invention including a traction bar similar to the one depicted in FIG. 4 and a non planar cam where the sliding rear joint rests.

The direction of the slotted holes (14) can be determined by different criteria and be non perpendicular to the applied pressure load. In the load range where the elastic element of the traction bar (11) is active, there is a sliding movement of the cylindrical joint (6) along the slotted holes (14), FIG. 2. These holes will drive a part of a mobile system or mechanism, so they are functionally a cam. The criteria used to define the cam profile may be multiple and for this configuration it has been decided to minimize the loads applied on the base plate (10) so a planar cam, perpendicular to the pressure loads acting on the base plate is chosen. The cam represented in FIG. 5 allows the use of two different four bar linkage mechanisms as a function of the applied load range.

When the applied load on the traction bar (11) is less than the spring (21) preload, FIG. 4, the length $L_1$ of this bar places the pin of the cylindrical joint (6) on the upper front part of the cam surface (14). When the load applied on the traction bar (11") increases this bar length to L2 the pin of the cylindrical joint (6") lies on the lower rear part of the cam surface (14") so the base plate (10) now lies on position (10"), rotating a certain angle α, increasing the nozzle exit area (9) to (9") without changing the nozzle throat area (8) as the convergent petal (1) keeps its original position. The compression bar (5) moves to a new position (5").

What is claimed is:

1. A gas turbine engine nozzle including a divergent petal articulated on a front edge to a convergent petal by a first cylindrical joint and articulated at an intermediate point between the front edge and a rear edge of the divergent petal to a compression bar by a second cylindrical joint, the first and second cylindrical joints being arranged perpendicular to an engine axis, the divergent petal comprising:

a base plate having a front edge, a back edge, and a back side;

at least one stiffening fin attached to and extending longitudinally along the back side of said base plate, said stiffening fin having a front hole and an intermediate slotted hole defined laterally therein;

a traction bar positioned on the back side of said base plate and including rear lugs with holes defined therein; said traction bar being linked to the convergent petal and the compression bar by the first and second cylindrical joints, respectively; the base plate being related to said traction bar by the first cylindrical joint perpendicular to the engine axis, coincident with a joint between the convergent and divergent petals; and a sliding joint between the slotted holes and the holes in the rear lugs of said traction bar and coincident with the second cylindrical joint between said traction bar and the compression bar, displacement of the sliding joint being functionally parallel to said base plate.

2. A gas turbine engine in accordance with claim 1, wherein the stiffening fin extends from proximate the front end to proximate the rear end of said base plate.

3. A gas turbine engine in accordance with claim 1, wherein said traction bar has an elastically varying length as a function of applied axial load between predetermined extreme values that allow a change in nozzle exit area while nozzle throat area remains constant.

4. A gas turbine engine in accordance with claim 3, wherein said traction bar comprises:

at least two concentric bars telescopically mounted, said bars having stop ends for limiting elongation of said traction bar; and a spring supported between said bars so as to push both bars to a minimum bar length position.

5. A gas turbine engine in accordance with claim 1, wherein the intermediate slotted hole has a sliding trajectory that guides a cam for driving the second cylindrical joint to allow variation in geometry of the divergent petal.

* * * * *

UNITED STATES PATENT AND TRADEMARK OFFICE
CERTIFICATE OF CORRECTION

PATENT NO. : 6,098,400
DATED : August 8, 2000
INVENTOR(S) : Javier ESTEVAS-GUILMAN It is certified that error appears in the above-identified patent and that said Letters Patent is hereby corrected as shown below:

Title page, Item [73] Assignee, correct the spelling from "Industrai de Turbo Propulsores, S.A." to --Industria de Turbo Propulsores, S.A.--

Signed and Sealed this

Twenty-fourth Day of April, 2001

*Attest:*

*Attesting Officer*

NICHOLAS P. GODICI

Acting Director of the United States Patent and Trademark Office